W. L. MIGGETT.
MOTOR VEHICLE.
APPLICATION FILED SEPT. 16, 1911.
1,203,033.
Patented Oct. 31, 1916.
4 SHEETS—SHEET 1.
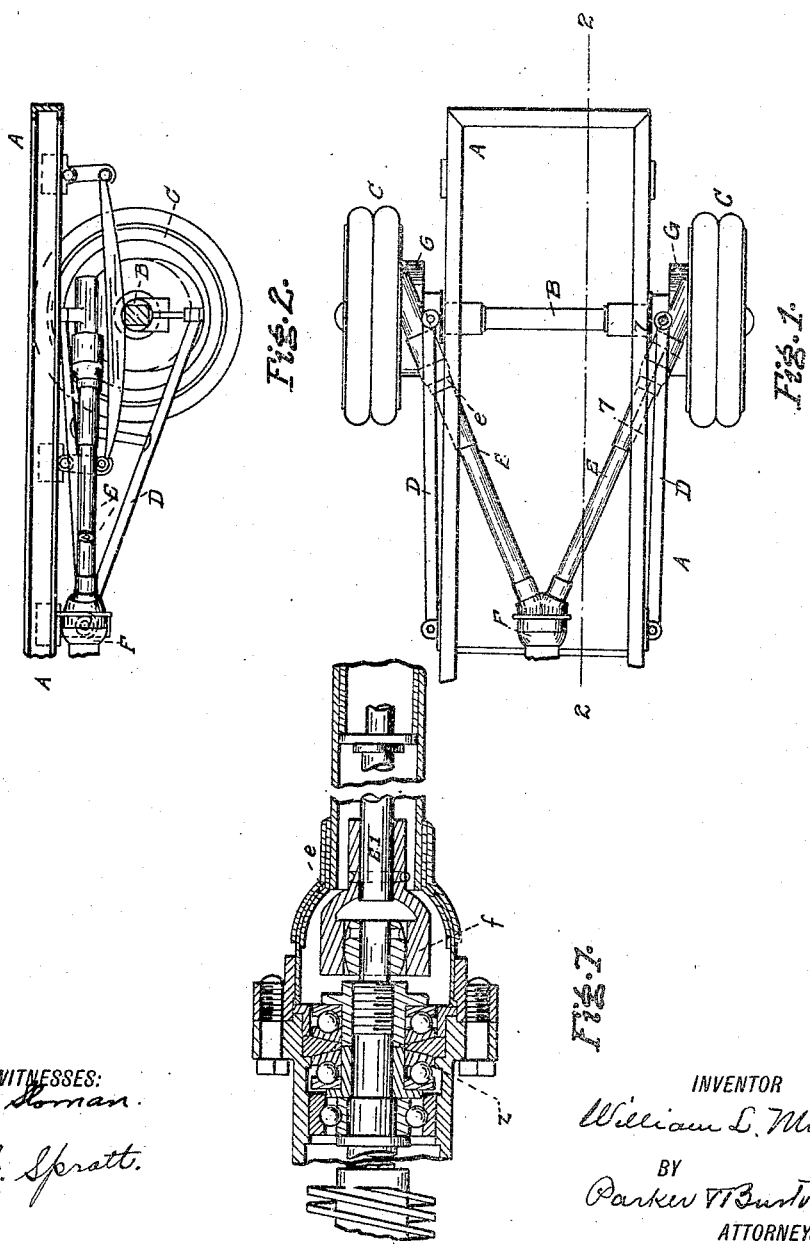
WITNESSES:
INVENTOR
William L. Miggett
BY
Parker & Burton
ATTORNEYS

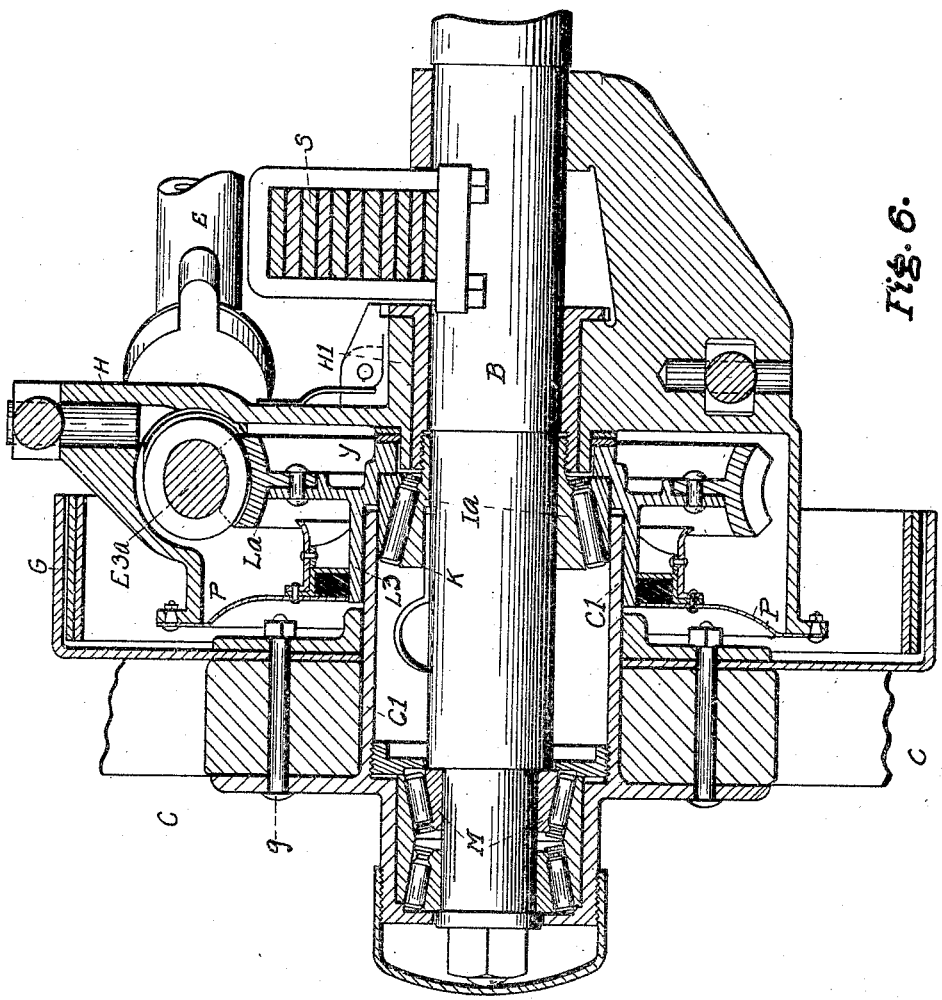

UNITED STATES PATENT OFFICE.

WILLIAM L. MIGGETT, OF ANN ARBOR, MICHIGAN.

MOTOR-VEHICLE.

1,203,033.　　　　　Specification of Letters Patent.　　Patented Oct. 31, 1916.

Application filed September 16, 1911. Serial No. 649,749.

*To all whom it may concern:*

Be it known that I, WILLIAM L. MIGGETT, a citizen of the United States, residing at Ann Arbor, county of Washtenaw, State of Michigan, have invented a certain new and useful Improvement in Motor-Vehicles, and declare the following to be a full, clear, and exact description of the same, such as will enable others skilled in the art to which it pertains to make and use the same, reference being had to the accompanying drawings, which form a part of this specification.

My invention relates to motor vehicles, and an object of my improvements is to provide an improved wheel mounting in connection with means for driving the wheel. I accomplish this object in the device shown in the accompanying drawings, in which,—

Figure 3:
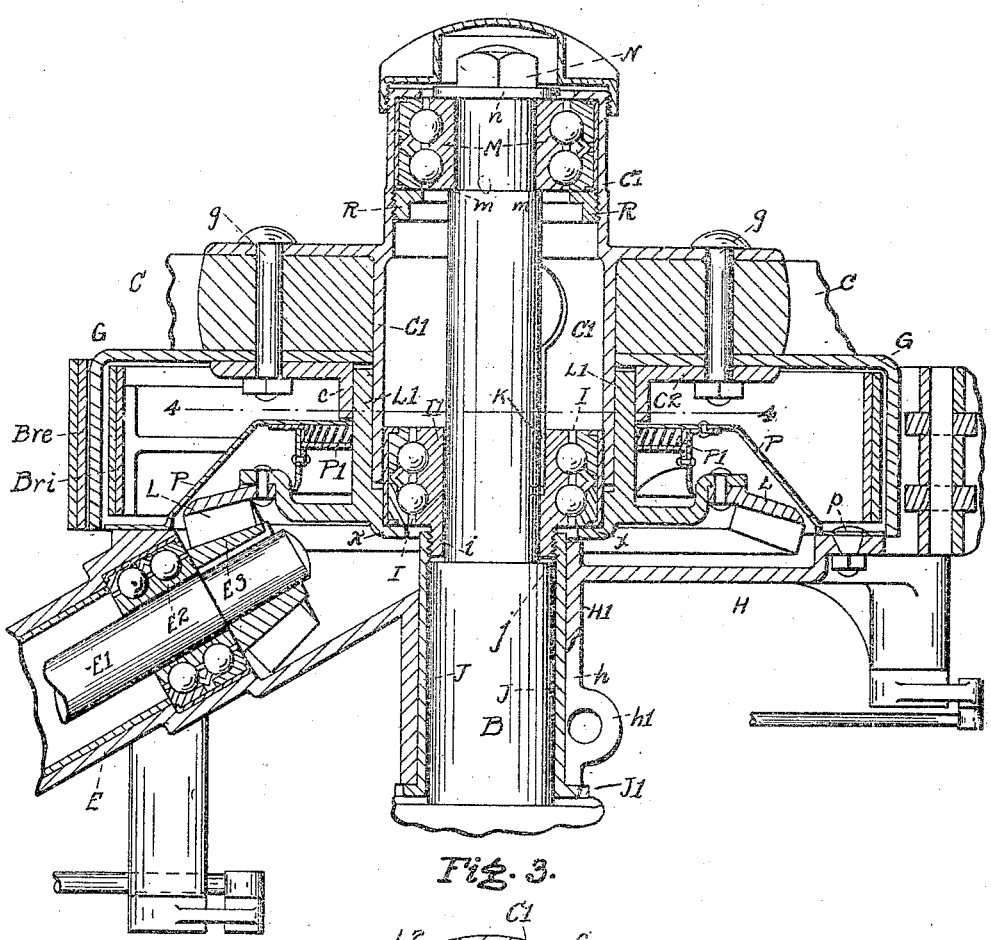
Figure 4:
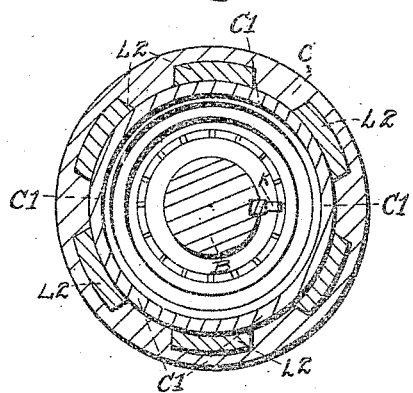
Figure 5:
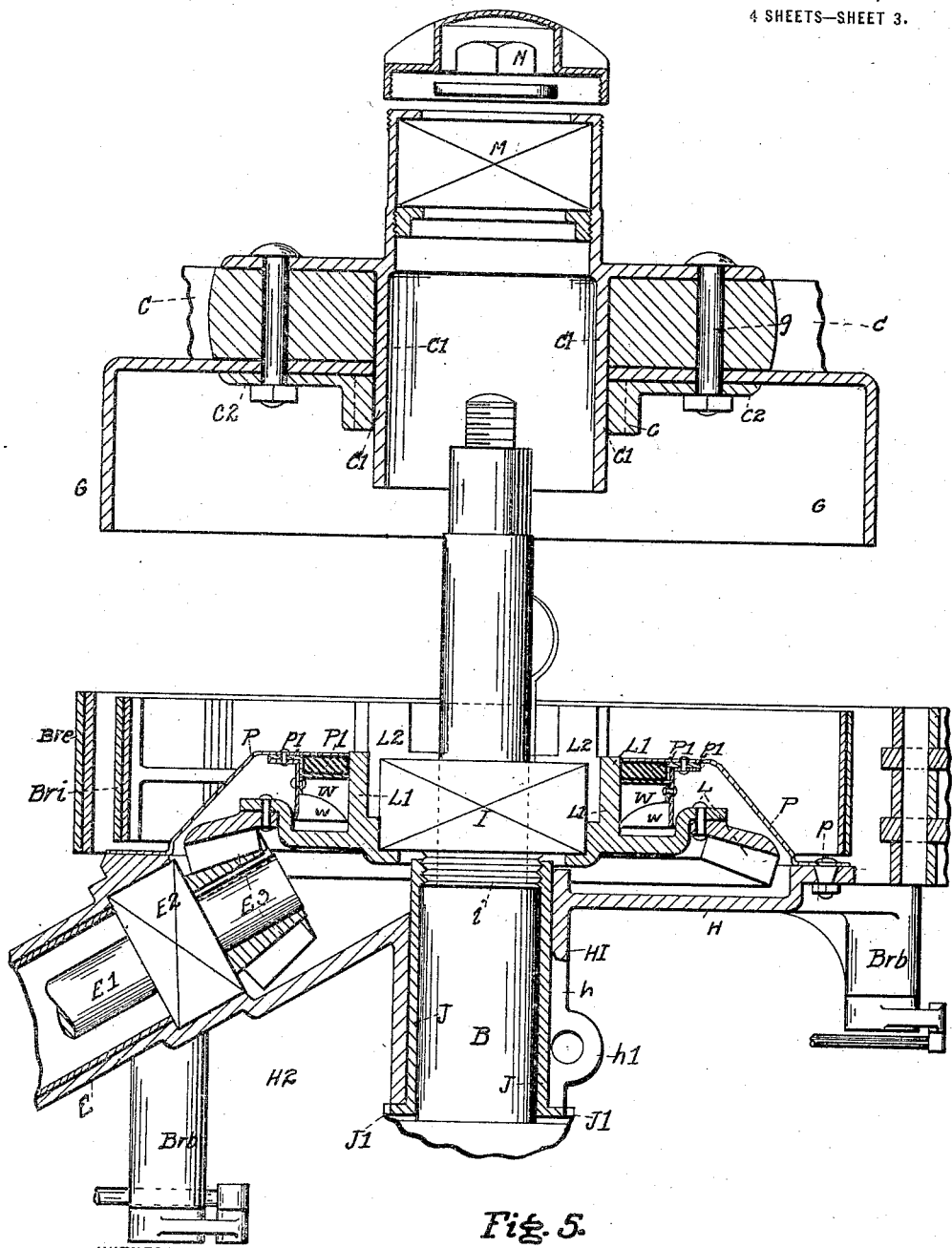

Figure 1, is a plan view of the rear portion of the chassis of an automobile showing a part of the driving mechanism. Fig. 2, is a side view of the same. Fig. 3, is a horizontal section of the wheel and adjacent parts. Fig. 4, is a detail sectional view on the line 4—4 of Fig. 3, looking from beneath said figure. Fig. 5, is a view similar to Fig. 3, except that the parts of the wheel mounting are separated. Fig. 6, shows a modified construction, the section being in a plane at right angles to that upon which the section of Figs. 3 and 5 are taken. Fig. 7, is a detail section taken on the line 7—7 of Fig. 1.

A, A, indicates the side pieces of the frame of the chassis; B, is the rear axle; C, C, are wheels adapted to turn upon the axle B.

D, D, are radius rods secured at one end to the frame and at the other end to a gear case mounted upon the axle B.

E, E, are tube inclosing driving shafts $E^1$ (Figs. 3 and 5).

F, is a casing inclosing the balance gear in which are connected the two driving shafts $E^1$ in the tubes E. The construction of the driving gear as far as the shafts $E^1$, $E^1$, and the balancing gear contained in the casing F is concerned, is the same as that shown in my application now pending in the United States Patent Office and having the Serial No. 578,311.

G, is a cylindrical brake drum having one end closed and secured by bolts $g$ to the wheels C. The inner end of the drum G is open except as closed by the plate H.

H, is a stationary plate serving as a mounting for the gears and inclosure therefor and for brake mounting and for attaching the torque resisting members. This plate H is provided with a hub $H^1$ slotted toward its inner end, as indicated at $h$ and provided with ears $h^1$ through which a bolt may be passed by which bolt the parts of the hub H may be drawn together to clamp an inclosed object.

B$ri$ and B$re$ are respectively interior and exterior brake straps. These straps are mounted on the plate H and are controlled in the usual way by levers, and spindles in bearing B$rb$ on the plate H.

I, is a ball bearing upon the axle B, keyed to prevent relative rotation by a key K, but adapted to move longitudinally on said axle.

$I^1$, is the inner annulus or race of the ball bearing I; this annulus is provided with screw threads $i$ at its inner end.

The axle B passes through the hub $H^1$. There is a sleeve J surrounding the axle B and fitting within the hub $H^1$ of the plate H. The sleeve J is provided with internal screw threads at its outer end which engage the screw threads $i$ on the annulus $I^1$.

$J^1$, is a head upon the sleeve J adapted to be grasped by a spanner wrench. The head $J^1$ abuts against the inner end of the hub $H^1$ of the plate H.

L, is a beveled gear wheel having a hub $L^1$ which passes over the ball bearing $I^1$ and having a shoulder $x$ abutting against the inner face of the outer annulus of said ball bearing, as shown in Fig. 3.

$C^1$, is a cylindrical hub to the wheel C. This hub extends partially over the ball bearing $I^1$ and within the hub $L^1$ of the beveled gear wheel L.

M, is a ball bearing upon the outer end of the axle B abutting against a shoulder $m$ on said axle.

$n$, is a washer upon the outer end of the axle B bearing against the outer face of the ball bearing M.

N, is a nut upon screw threads at the outer end of the axle B bearing against the washer $n$ and holding the bearing M in place.

The hub $C^1$ of the wheel C extends over the bearing M.

R, is an annulus having screw threads which engage screw threads in the hub $C^1$. The annulus R is so located that its outer face abuts against the inner face of the outer portion of the ball bearing M. By the annulus R and the outer inturned end of the hub C¹ engaging the outer annulus of the ball bearing M, the hub is held in position. Ball bearing M is adapted to resist thrust in both directions.

P, is a sheet metal plate dished out into the form shown in cross section in Figs. 3 and 5, its outer edge being secured to the inner surface of the plate H, by bolts $p$. The plate P extends over the beveled gear wheel L and extends inward so that its inner edge comes adjacent to the hub L¹ of said gear wheel.

P¹, is a packing held in place by the cupped ring $p^1$ by which a tight joint between the inner edge of the plate P and the wheel hub L¹ may be secured.

W, is a cylindrical hood surrounding the cupped ring $p^1$, extending toward the gear wheel L.

$w$, is a scraper fastened inside the hood W, its inner edge coming against the hub L¹ of the gear L.

Lubrication may be placed and will be retained between the plates P and H and within the drum $w$, the latter preventing the lubrication from adhering to the hub L¹.

E¹, is a driving shaft.

E², is a ball bearing for the shaft E¹. E³, is a beveled gear wheel or pinion upon the end of said shaft, its teeth engaging the teeth of the beveled gear wheel L (Fig. 3). The shaft E¹ bears in a bracket H² forming a part of the stationary plate H.

C², is an annular plate secured by the bolts $g$, $g$, to the inclosed end of the brake drum G and to wheel C. The annulus C² is provided with a boss $c$ which extends inward and surrounds the hub C¹ of the wheel C. The boss $c$ is provided with slots $c^1$ extending parallel to its axis from its inner end and from the inner surface of the hub.

L², (Fig. 5) are teeth adapted to fit in the slots in the boss $c$ to form an engagement between the boss $c$ and the hub L¹ of the gear wheel L.

By turning the sleeve J by a spanner wrench engaging its head J¹, the position of the bearing I may be adjusted longitudinally of the axle B relative to the plate H and thereby the relative positions of the gear wheels E³ and L may be adjusted.

To remove the wheel, all that is necessary is to take off the nut N and washer $n$, when the wheel may be drawn directly from the axle carrying the bearing M with it. The thrust of the gear wheel E³ presses the gear wheel L against the inner end of the bearing I.

While I contemplate using conical gears, I have shown a worm and gear wheel which may be used as well, as indicated in Fig. 6, in which E³a is the worm and L$a$ the worm wheel. The other construction is entirely similar to that above described except that I provide friction washers $y$ between the hub L³ of the worm wheel L$a$ and the plate H where the worm is used, to take the thrust of the worm when the car is being driven backward.

In Fig. 7, I have indicated a construction that may be used when radius rods D, D, are used. This construction is intended to secure some degree of flexibility in the tubes E, E. A slip joint for instance, is provided at $e$ (Fig. 7) and a universal joint $f$ is interposed in the shaft, two parts of which therefore may have relative longitudinal movement to a limited extent. There are also provided at $z$ the bearings usually used in worm gearing.

The ball bearings I and M are radial and thrust bearings.

It will be noted that in the above construction, the wheel may have an end motion relative to the axle without disturbing the accurate mesh of the driving gears and that a simple means for adjusting the mesh of the gears without disassembling the parts is provided. It will also be noted that there is a means for quickly and easily removing the driving wheel from the axle without disturbing the gears, their mountings, or their protective casings.

It will be noticed that in my other application above referred to, I use the tubes E, E, as torque members while in the present construction, I have provided special separate torque members to take the various strains and have constructed the tubes and shafts with a certain degree of flexibility.

It will be noticed that all the driving parts are mounted on the plate H, which may have a slight movement longitudinally of the axle. The teeth L² by which the driving wheel C is engaged to drive the same are freely removable by movement in the direction of the length of the axle. The position of the gear wheel L may be adjusted relative to the gear wheel E³, while both gear wheels are secured to the plate H. The plate H is so mounted upon the axle that it may rotate relative thereto. Therefore the plates H and P combine to form a casing which floats upon the axle.

What I claim is:—

1. In a motor vehicle, the combination of a driving wheel rotatably mounted on said vehicle, a gear wheel coaxial with said driving wheel, means for engaging said gear wheel and driving wheel so as to prevent relative angular motion and to permit motion in the direction of their axis, a shaft and gear adapted to drive said gear wheel, said shaft being mounted in a stationary bearing, and means for adjusting the position of the first mentioned gear wheel relative to the driving wheel, the relative positions of said gear wheels being such that the movement of the first mentioned gear wheel relative to the driving wheel shall adjust the mesh of said gear wheels.

2. In a motor vehicle, the combination of a driving wheel provided with a hub $C^1$, said hub being provided with slots extending parallel to its axis at the outer wall thereof, a gear wheel L provided with a sleeve fitting upon said hub, the outer end of said sleeve being slotted parallel to the axis thereof to provide teeth to fit into the slots of the hub $C^1$, the engagement between said slots and teeth being such as to permit relative motion between said hub and gear wheel in the direction of the axis of said wheel.

3. In a motor vehicle, the combination of an axle, a driving wheel mounted to turn thereon, said driving wheel being provided with a hub, a bearing upon said axle within said hub, a gear wheel secured upon said bearing in axial alinement with said driving wheel and bearing against the inner face of said bearing, said gear wheel and driving wheel being provided with interlocking teeth that permit relative motion in the direction of their axis, a pinion adapted to engage and drive said gear wheel, and means for adjusting the position of said bearing to regulate the relative distance apart of said pinion and gear wheel.

4. In a motor vehicle, the combination of the axle B having a bearing I thereon, a driving wheel mounted upon said bearing, a gear wheel mounted upon said bearing coaxial with said driving wheel, said driving wheel and gear wheel being provided with interlocking teeth that shall permit relative movement of said wheels in the direction of their axis, a casing inclosing said gear wheel and bearing, a sleeve J extending through said casing and provided with screw threads $i$ engaging screw threads on the inner annulus of said bearing, and means whereby said sleeve can be rotated to adjust the position of said bearing.

5. In a motor vehicle, the combination of the axle B having a bearing I thereon, a driving wheel mounted upon said bearing, a gear wheel mounted upon said bearing coaxial with said driving wheel, said driving wheel and gear wheel being provided with interlocking teeth that shall permit relative movement of said wheels in the direction of their axis, a casing inclosing said gear wheel and bearing, a sleeve J extending through said casing and provided with screw threads $j$ engaging screw threads on the inner annulus of said bearing, and means whereby said sleeve can be rotated to adjust the position of said bearing, a driving shaft, a fixed bearing for said driving shaft in said casing, and a gear wheel on said driving shaft adapted to engage the first mentioned gear wheel, the relative position of said gear wheel being such that the adjustment of the first mentioned wheel shall adjust the mesh of said gears.

6. In a motor vehicle, the combination of an axle, a stationary plate H surrounding said axle and provided with a hub $H^1$, a gear wheel L surrounding said axle adjacent to said plate, a driving shaft $E^1$ mounted in bearings on said plate, a pinion on said driving shaft engaging said gear wheel, a sleeve J extending through said hub and surrounding said axle and bearing upon said axle, said gear wheel being mounted on said bearing, said sleeve being provided with screw threads at its inner ends adapted to engage screw threads on said bearing, and means for rotating said sleeve, for the purpose described.

7. In a motor vehicle, the combination of a driving wheel having cylindrical brake drums G, G, secured coaxial therewith, having its end adjacent to the driving wheel closed, and its inner end open, a fixed plate H having a hub $H^1$, an axle B extending through said hub and through said driving wheel, a bearing I mounted on said axle, said driving wheel being mounted on said bearing, a gear wheel L surrounding said axle and mounted on said bearing having teeth $L^2$ engaging slots in said driving wheel so as to permit relative motion in the direction of the axis of said wheel, a sleeve J extending through the hub $H^1$ around said axle having screw threads $j$ engaging the screw threads $i$ on said bearing, said sleeve being provided at its inner end with a head engaging the inner end of said bearing.

8. In a motor vehicle, the combination of a driving wheel having a cylindrical brake drum G, G, secured coaxial therewith, having its end adjacent to the driving wheel closed and its inner end open, a fixed plate H having a hub $H^1$, an axle B extending through said hub and through the said driving wheel, a bearing I mounted on said axle, said driving wheel being mounted on said bearing, a gear wheel L surrounding said axle and mounted on said bearing having teeth $L^2$ engaging slots in said driving wheel so as to permit relative motion in the direction of the axis of said wheel, a sleeve J extending through the hub $H^1$ around said axle having screw threads $j$ engaging screw threads $i$ on said bearing, said sleeve being provided at its inner end with a head engaging the inner end of said bearing, and a driving shaft $E^1$ having a bearing on the plate L provided with a gear wheel $E^3$ engaging the gear wheel L to drive the same, said gear wheels being so located that the adjustment of said first mentioned gear shall adjust the mesh of said gears.

9. In a motor vehicle, the combination of an axle, a driving wheel thereon, a gear wheel adapted to drive said driving wheel, a bearing at the outer end of hub of said driving wheel adapted to resist axial thrusts in both directions, a second bearing upon which rests the inner end of hubs of said driving wheel and said gear wheel, and adjustable means for keeping said gear wheel in fixed relation to its actuating means while permitting relative axial motion between said driving wheel and said gear wheel.

10. In a motor vehicle, the combination of an integral axle, a driving wheel thereon, a gear wheel adapted to drive said driving wheel, a pinion adapted to drive said gear wheel, said gear together with its driving pinion being inclosed in a case floating upon said axle at the end thereof, said case keeping said gear and pinion in fixed rotative relation to each other, while permitting the driving wheel to have end motion on the axle.

11. In a motor vehicle, the combination of an integral axle, a driving wheel thereon, a pair of gears adapted to drive said wheel, said gears being inclosed in a case floating upon said axle at the end thereof, said case keeping said gears in fixed mesh while permitting the driving wheel a longitudinal motion on the axle, and means to permit the removal of the driving wheel without disturbing any other assembled parts by removing the nut and washer from the end of the axle.

12. In a motor vehicle, the combination of an axle, a wheel thereon, a pair of gears adapted to drive said wheel, said gears inclosed in a case floating upon the axle, said case keeping the gears in fixed mesh while permitting a longitudinal motion of the wheel upon the axle, said casing being provided with bosses or other means for mounting the brakes, and for attaching parts designed to act as torque resisting members, push rods and radius rods.

13. In a motor vehicle, a combined driving gear and wheel mounted on a solid fixed axle, in which a bearing in the outer end of the wheel hub takes the end thrusts of the wheel relative to the axle in both directions, a bearing at the inner end of the wheel, which, while taking the radial load of the wheel and gear, is free to take only the axial or end thrust due to the driving gears, the gears being kept in proper mesh by being mounted and inclosed in a casing containing oil that is permitted to float longitudinally on the axle either independently of or in unison with the end motion of the driving wheel on the axle due to wear of bearings, and means by which the wheel may be taken off by first removing the hub cap, and nut and washer from the axle without opening said casing containing oil, and without disturbing any other assembled parts.

14. In a motor vehicle, a combined driving wheel and gear mounting, in which is used a solid fixed axle, and types of gearing requiring for proper mesh, to be adjusted and held accurately in the longitudinal direction of the axle, means for accomplishing the before mentioned result, while permitting the driving wheel to move longitudinally on the axle due to wear of bearings, means for mounting brakes, torque members and braces, and means for removing the driving wheel by taking off the nut and washer at the end of the axle, without opening the oil casing around the gears or disturbing any other assembled parts.

In testimony whereof, I sign this specification in the presence of two witnesses.

WILLIAM L. MIGGETT.

Witnesses:
VIRGINIA C. SPRATT,
ELLIOTT J. STODDARD.